United States Patent [19]

Yoshimura et al.

[11] Patent Number: 4,466,414

[45] Date of Patent: Aug. 21, 1984

[54] SUPERCHARGED INTERNAL COMBUSTION ENGINE

[75] Inventors: Junjiro Yoshimura, Okazaki; Kenji Yamada, Aichi; Haruyuki Obata, Susono, all of Japan

[73] Assignees: Nippondenso Co., Ltd., Kariya; Toyota Jidosha Kogyo Kabushiki Kaisha, Toyota, both of Japan

[21] Appl. No.: 395,341

[22] Filed: Jul. 6, 1982

[30] Foreign Application Priority Data

| Jul. 7, 1981 [JP] | Japan | 56-100917[U] |
| Jul. 7, 1981 [JP] | Japan | 56-100918[U] |
| Dec. 10, 1981 [JP] | Japan | 56-199414 |
| Dec. 10, 1981 [JP] | Japan | 56-199415 |

[51] Int. Cl.³ .............................................. F02D 23/00
[52] U.S. Cl. .................................................... 123/564
[58] Field of Search ...................... 60/600, 601, 611; 123/564, 559

[56] References Cited

U.S. PATENT DOCUMENTS

| 1,663,936 | 3/1928 | Cozette | 123/559 |
| 2,067,757 | 1/1937 | Fielden | 123/564 |
| 2,164,451 | 7/1939 | Fast | 123/559 X |
| 2,283,694 | 5/1942 | Perrine | 123/559 |
| 2,292,233 | 8/1942 | Lysholm | 123/559 |
| 2,383,979 | 9/1945 | Lysholm | 60/601 |
| 2,669,982 | 2/1954 | Schowalter et al. | 123/564 X |

FOREIGN PATENT DOCUMENTS 2416287 10/1975 Fed. Rep. of Germany ........ 60/611

Primary Examiner—Michael Koczo
Attorney, Agent, or Firm—Cushman, Darby & Cushman

[57] ABSTRACT

An air supplying apparatus comprises, an air intake channel, one end of which is opened to the atmosphere, the other end of which is connected to a cylinder and in which an air stream flowing toward the cylinder is provided, a throttle valve provided in the other end side portion of the air intake channel, movable between a first position where the throttle valve sets the cross-sectional area of the air stream minimum and a second position where the throttle valve sets the same maximum, thereby controlling the output power of the engine, a control valve provided in one end side portion of the first channel, movable between a third position where the control valve closes the air intake channel and a fourth position where the control valve opens the air intake channel, a control channel attached to the air intake channel to by-pass the control valve, a supercharger provided in the control channel, a link mechanism connecting the throttle valve to the control valve, to move the control valve from the fourth position to the third position when the throttle valve moves from the first position to the second position, and to move the control valve from the third position to the fourth position when the throttle valve moves from the second position to the first position, and play mechanism attached to the link mechanism, for allowing one of the throttle and control valves to move when the other valve is held at a fixed position.

13 Claims, 16 Drawing Figures

SUPERCHARGED INTERNAL COMBUSTION ENGINE

BACKGROUND OF THE INVENTION

The present invention relates to an air supplying apparatus for an internal combustion engine and, more particularly, to an air supplying apparatus having a supercharger.

A supercharger for supplying pressurized air to an air intake channel of an internal combustion engine such as a gasoline engine is generally driven by a crankshaft of the engine or by the energy of an engine exhaust gas stream. The supercharger of this type can supercharge the engine across an entire range of engine operating conditions from low rotating rate and low load operation to high rotating rate and high load operation.

However, the operating conditions of the engine are constantly changing. If the supercharger is always operated across the entire range described above, output power loss may caused.

For this reason, a supercharger control valve is conventionally disposed at the upstream side of a throttle valve in the air intake channel. A supercharger channel is attached to the air intake channel by a by-pass at the supercharger control valve. In particular, an air pump which acts as the supercharger is disposed in the supercharger channel and the supercharger control valve is interlocked with the throttle valve through a rigid link mechanism so that the supercharger control valve is closed when the throttle valve is opened. In this manner, if the throttle valve is closed or slightly open, the supercharger control valve is opened, whereby supercharged air flows back to the upstream side of the air intake channel and supercharging is substantially interrupted. However, if the throttle valve is fully or substantially opened, the supercharger control valve is completely closed. As a result, proper supercharging is performed.

Since the throttle valve and the supercharger control valve are connected through the rigid link mechanism, any trouble occurring in one valve is directly transmitted to the other valve. Although the supercharger can be operated in a desired operating range of the engine as described above, this new problem is presented.

SUMMARY OF THE INVENTION

The present invention has been made in consideration of the above mentioned circumstances and has for its object to provide an air supplying apparatus which causes a supercharger to operate in a desired operating range and which does not transmit trouble occurring in either one of a throttle valve and a supercharger valve to the other thereof.

DETAILED DESCRIPTION OF THE PREFERRED EMBODIMENTS

A first embodiment of an air supplying apparatus according to the present invention will be described in detail with reference to FIGS. 1 to 7.

Figure 1:
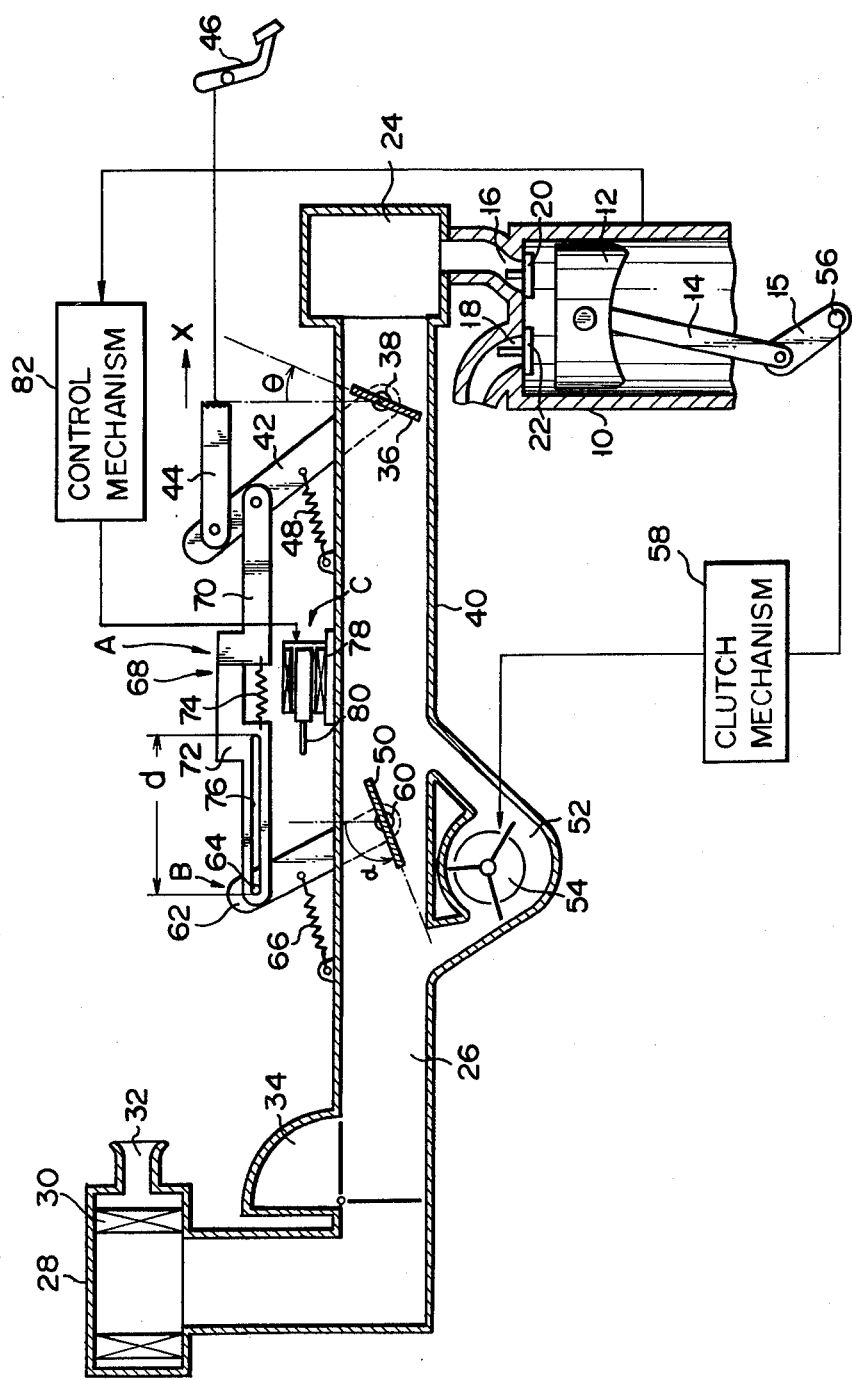
FIG. 1 is a schematic side view of a first embodiment of an air supplying apparatus according to the present invention wherein a throttle valve is inclined at a minimum angle ($\theta = 10°$) to slightly open an air intake channel.

Referring to FIG. 1, reference numeral 10 denotes a cylinder of an engine. A piston 12 is slidably fitted in the cylinder 10. The piston 12 is connected to a crank 15 through a connecting rod 14. An intake port 16 and an exhaust port 18 are formed at the upper portion of the cylinder 10. Intake and exhaust valves 20 and 22 are respectively disposed at the intake and exhaust ports 16 and 18 to allow them open or close. The intake port 16 communicates with an air intake channel 26 through a surge tank 24.

An air cleaner 28 is connected at the upstream end portion of the air intake channel 26. The air cleaner 28 has a cleaner element 30 therein and a port 32 open to the atmosphere at one side thereof. Atmospheric air passes through the port 32 of the air cleaner 28 and is filtered by the cleaner element 30. The filtered air is guided to the air intake channel 26. Note that an air flowmeter 34 is arranged at the upstream side of the air intake channel 26.

A throttle valve 36 is pivotally disposed in the downstream portion of the air intake channel 26. A throttle shaft 38 is integrally mounted at the center of the throttle valve 36. Both ends of the throttle shaft 38 extend through the air intake channel 26 and are pivoted on the side walls of a duct 40 which defines the air intake channel 26. The lower end (FIG. 1) of a throttle lever 42 is fixed to one extending end of the throttle shaft 38. The left end (FIG. 1) of an actuating lever 44 is pivotally mounted at the upper end of the throttle lever 42. The right end of the actuating lever 44 is coupled to an accelerator pedal 46 inside the car. The actuating lever 44 is moved in the direction indicated by arrow X when the driver depresses the accelerator pedal 46, that is, when the accelerator pedal 46 is rotated in the clockwise direction (FIG. 1).

A first spring 48 is stretched between the throttle lever 42 and a upper plate of the duct 40. The first spring 48 urges the throttle lever 42 in the counterclockwise direction (FIG 1), that is, the actuating lever 44 connected to the throttle lever 42 in a direction opposite to the direction indicated by arrow X. The throttle lever 42 abuts against a stopper (not shown) and is kept at an initial position. When the throttle lever 42 is kept at the initial position, the throttle valve 36 is inclined at an angle (to be referred as a throttle angle $\theta$ hereinafter) of 10° measured in the clockwise direction with respect to its vertical axis. A throttle angle $\theta$ of 10° occurs when the driver does not depress the accelerator pedal 46 so that the engine is kept in the idling state. The throttle valve 36 opens the air intake channel 26 to a minimum in the above-mentioned condition. The throttle valve 36 is rotated in the clockwise direction against the urging force of the first spring 48 when the accelerator pedal 46 is depressed. When the driver depresses the accelerator pedal 46 to the limit, the throttle angle $\theta$ is set at 90° and the throttle valve 36 fully opens the air intake channel 26.

A supercharger control valve 50 which is free to close the air intake channel 26 is pivotally disposed in that portion of the air intake channel 26 which is positioned between the air flowmeter 34 and the throttle valve 36. A supercharger channel 52 is connected to the air intake channel 26 by a by-pass around the supercharger control valve 50. The upstream end of the supercharger channel 52 communicates with that portion of the air intake channel 26 which is positioned between the air flowmeter 34 and the supercharger control valve 50, while the downstream end thereof communicates with that portion thereof which is positioned between the supercharger control valve 50 and the throttle valve 36. An air pump 54 which acts as a supercharger is disposed in the supercharger channel 52. The air pump 54 is driven by a crankshaft 56 connected to the crank 15 of the engine.

The air pump 54 is connected to the crankshaft 56 through a clutch mechanism 58. The clutch mechanism is constructed to not transmit power when the throttle angle $\theta$ is less than 45°, and to transmit power when the throttle angle $\theta$ is more than 45°. The supercharging effect obtained from the air pump 54 is maximum when the supercharger control valve 50 completely closes the air intake channel 26, while the effect is correspondingly decreased when the supercharger control valve 50 is inclined at a predetermined angle to open the air intake channel 26.

A control valve shaft 60 is integrally mounted at the center of the supercharger control valve 50. Both ends of the control valve shaft 60 extend through the air intake channel 26 and are pivoted on the side walls of the duct 40. The lower end (FIG. 1) of a control lever 62 is fixed to one extending end of the control valve shaft 60, while a pin 64 extends at the upper end of the control lever 62. A second spring 66 is stretched between the control lever 62 and the upper plate of the duct 40. The second spring 66 urges the control lever 62 in the counterclockwise direction (FIG. 1).

The throttle lever 42 and the control lever 62 are connected to each other through a link mechanism 68 to define the pivotal position of the supercharger control valve 50. The link mechanism 68 comprises: a first arm 70, one end of which is pivotally mounted near the upper end of the throttle lever 42; a second arm 72, one end of which is free to abut against the other end of the first arm 70 and the other end of which is mounted on the upper end of the control lever 62; and a third spring 74 stretched between the other end of the first arm 70 and one end of the second arm 72, for urging them to abut each other. An elongated hole 76 with a length of a predetermined distance d is longitudinally formed in the second arm 72. The pin 64 is fitted into the elongated hole 76, so that the second arm 72 is rotatably and slidably mounted on the control lever 62. The urging force of the third spring 74 is greater than that of the second spring 66. The pin 64 of the control lever 62 usually abuts against that side surface of the elongated hole 76 which defines the other side (left in FIG. 1) thereof by the urging force of the second spring 66, unless the control lever 62 is erroneously locked. The first and second arms 70 and 72 which can be separated from each other, constitute a first play mechanism A, while the control lever 62 and the second arm 72 which are slidable alongside the air intake channel 26, constitute a second play mechanism B.

Figure 3:
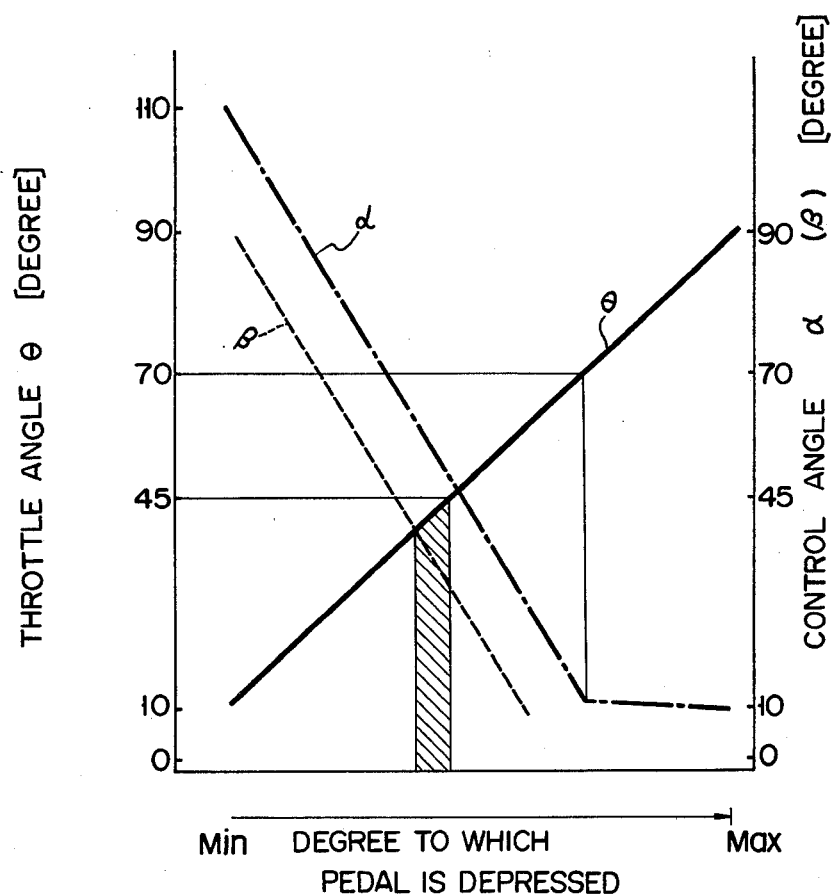
FIG. 3 is a diagram for explaining the throttle angle $\theta$ and control angle $\alpha$ ($\beta$) as functions of a degree to which an accelerator pedal is depressed.

The pivotal position of the control lever 62 and hence the pivotal position of the control valve 50 is defined by the pivotal position of the throttle lever 42 and hence the pivotal position of the throttle valve 36 through the link mechanism 68. In a first state where the other end of the first arm 70 abuts against one end of the second arm 72 and the pin 64 is positioned at the left side of the elongated hole 76, if the throttle valve 36 is kept in the idling position, the control valve 50 is inclined at an angle (to be referred to as a control angle $\alpha$ hereinafter) of 110° measured in the counterclockwise direction with respect to the vertical axis thereof, as shown in FIG. 1. As the throttle angle $\theta$ is increased from 10° (minimum angle) to 70° in accordance with an increase in depressing force to the accelerator pedal, the control valve 50 is rotated to decrease the control angle $\alpha$ from 110° to 10° as shown in FIG. 3. When the control angle $\alpha$ is set at 10°, the air intake channel 26 is completely closed by the control valve 50.

Figure 2:
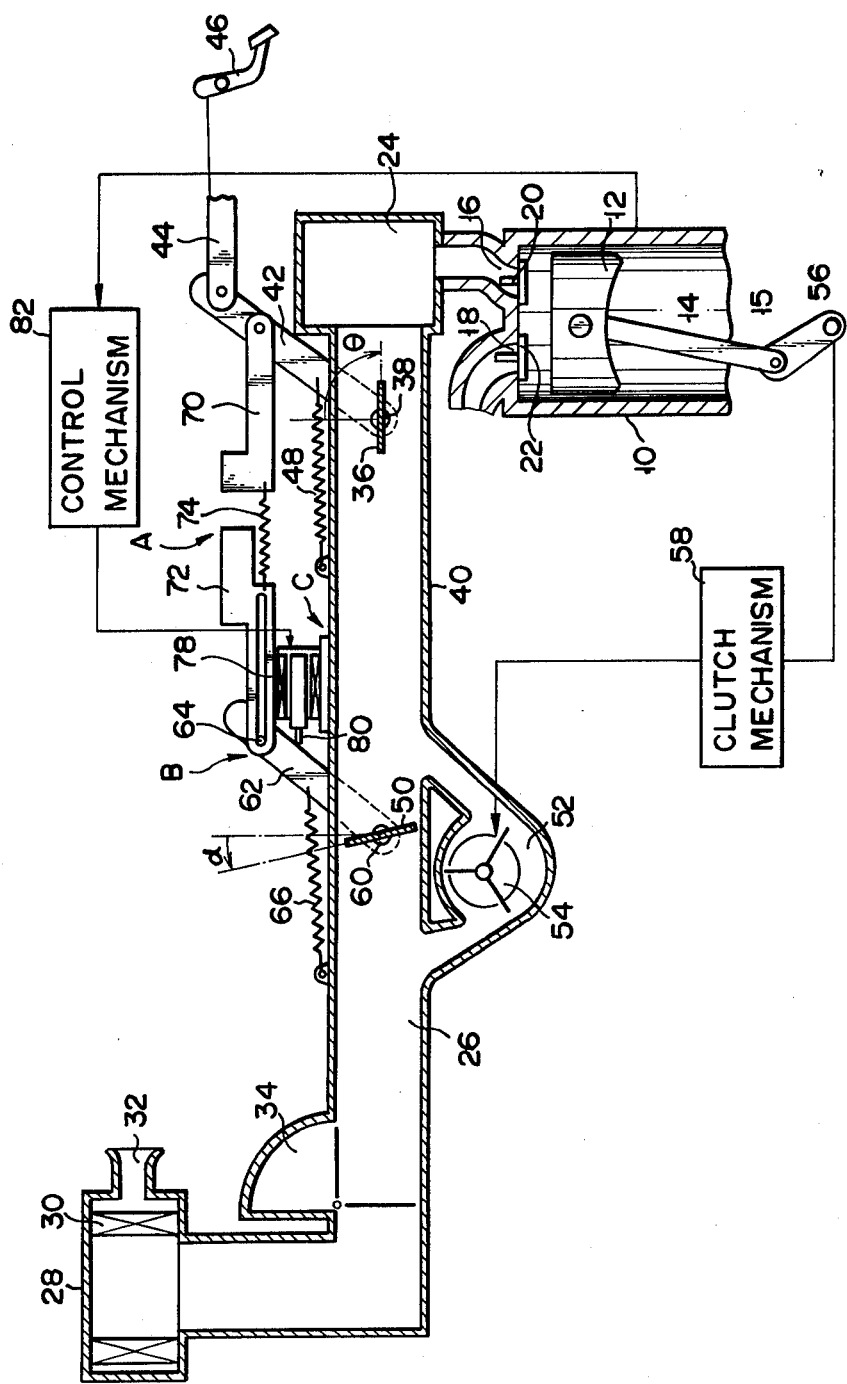
FIG. 2 is a schematic side view of the air supplying apparatus shown in FIG. 1 wherein the throttle valve is inclined at a maximum angle ($\theta = 90°$) to fully open the air intake channel.
Figure 4:
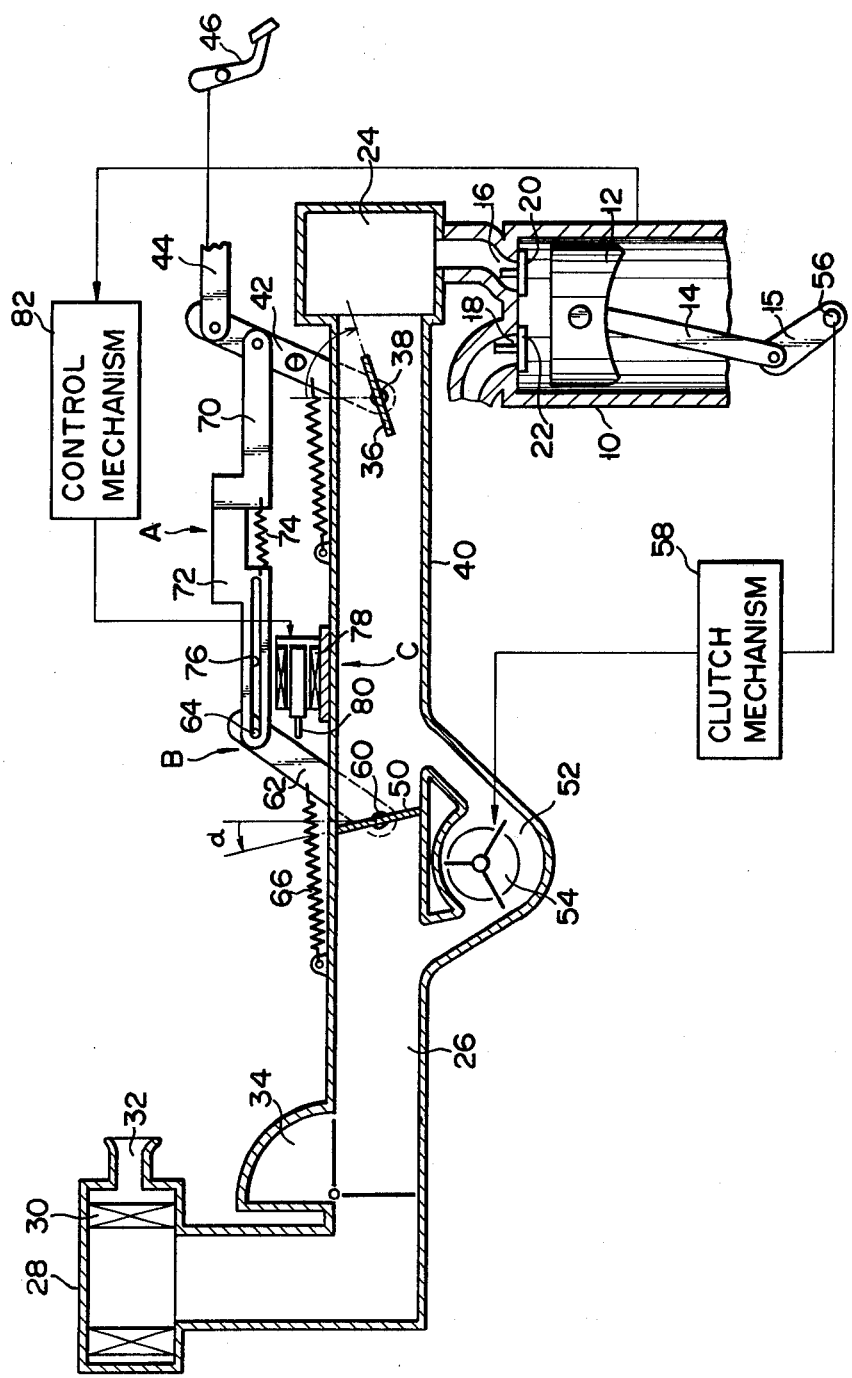
FIG. 4 is a schematic side view of the air supplying apparatus shown in FIG. 1 wherein the throttle valve is inclined ($\theta = 70°$) to almost fully open the air intake channel.

A solenoid 78 is fixed at a predetermined position on the upper plate of the duct 40. A plunger 80 is housed in the solenoid 78 to be movable along the direction indicated by arrow X. The plunger 80 is pulled into the solenoid 78 by a spring (not shown) in the direction indicated by arrow X and is kept at a first position when the solenoid 78 is de-energized. However, if the solenoid 78 is energized, the plunger 80 is forced to extend from the solenoid 78 against the urging force of the spring in the direction opposite to that indicated by arrow X and is kept at a second position. The solenoid 78 is positioned to bring the top of the plunger 80 into contact with the control lever 62 whose control angle α is set at 10°, as shown in FIG. 4, as the throttle angle θ of the throttle valve 36 becomes 70°, when the plunger 80 is kept at the first position. Even if the throttle valve 36 is rotated to increase the throttle angle θ to 70° or more, the plunger 80 inhibits the clockwise rotation of the control lever 62, as shown in FIG. 2. The control angle α is kept at an angle of 10°. As a result, the first and second arms 70 and 72 are separated from each other against the urging force of the third spring 74 and are brought into a second state.

A control mechanism 82 is connected to the solenoid 78. The control mechanism 82 continuously detects the rotating rate of the engine. Based on the detection results, the solenoid 78 is energized whenever the rotating rate of the engine is below a predetermined set value.

The solenoid 78, the plunger 80 and the control mechanism 82 constitute a release mechanism C.

The operation of the air supplying apparatus with the above arrangement will be described.

When the engine is driven at low rotating rate and with a low load, that is, when the engine is kept in the idling state where the driver does not depress the accelerator pedal 46, the throttle angle θ of the throttle valve 36 is kept at an angle of 10° to open the air intake channel 26 to a minimum, as shown in FIG. 1. In this state, the supercharger control valve 50 is fully opened, that is, the control angle α is set at 110°.

Figure 5:
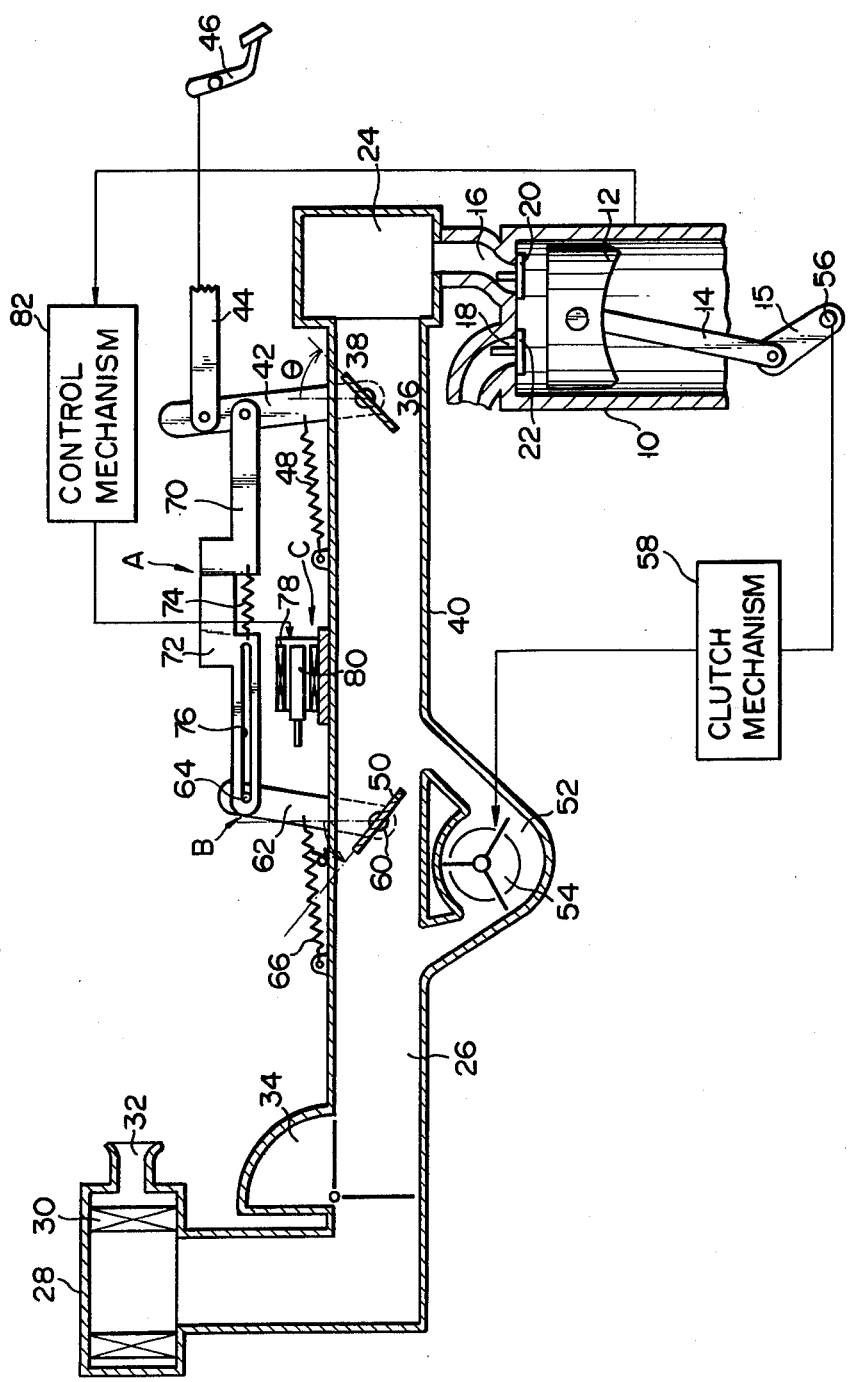
FIG. 5 is a schematic side view of the air supplying apparatus shown in FIG. 1 wherein the throttle valve is inclined ($\theta = 45°$) to half open the air intake channel.

When the driver depresses the accelerator pedal 46, the actuating lever 44 is pulled in the direction indicated by arrow X. The throttle lever 42 is rotated in the clockwise direction and the throttle valve 36 opens the air intake channel 26. In this case, the throttle lever 42 causes the link mechanism 68 to rotate the control lever 62, and the supercharger control valve 50 is rotated in the clockwise direction. When the throttle angle θ of the throttle valve 36 reaches about 45°, as shown in FIG. 5, the clutch mechanism 58 is actuated, so that the air pump 54 is then driven in accordance with the rotation of the crankshaft 56. At this time, as is apparent from FIGS. 5 and 3, the control angle α of the supercharger control valve 50 is greater than 45°. Referring to FIG. 5, since the supercharger valve 50 is still open, supercharging is insufficient even when the air pump 54 is operated, and supercharging pressure is therefore low. When the throttle valve 36 is further opened and the throttle angle θ reaches 70° as shown in FIG. 4, the supercharger control valve 50 completely closes the air intake channel 26 with the control angle α of 10°. As described above, when the throttle angle θ is greater than 70°, sufficient supercharging is performed. However, even when the throttle angle θ is increased from 70° to 90°, the supercharger control valve 50 is kept at the fully closed state since the link mechanism 68 has the first play mechanism A and only the third spring 74 expands. In the above embodiment, when the throttle angle θ of the throttle valve 36 is in a range of 70° to 90°, proper supercharge is performed. When the throttle angle θ is in a range of 45° to 70°, supercharging pressure is gradually varied according to the throttle angle θ.

When the clutch mechanism 58 is started to operate, the air supplying apparatus is not set in the optimal supercharging operation. Thus, the air pump 54 is initially driven with substantially no load and then gradually performs a supercharging operation. The load acting on the air pump 54 is so controlled as to be changed gradually. As a result, durability of the air pump 54 is greatly improved.

In the conventional air supplying apparatus, if the throttle angle θ of the throttle valve 36 is opened from 10° (completely closed) to 60°, a control angle β of the supercharger control valve is closed from 90° (fully opened) to 10° (completely closed) as shown by the broken line in FIG. 3. As is apparent from FIG. 3, during a time interval between the time when the throttle angle θ of the throttle valve is set at an angle of 45° and the time when the air pump is driven, the control angle β of the supercharger control valve is smaller than the throttle angle θ of the throttle valve as indicated by an area with hatched lines in FIG. 3. In the area with hatched lines, the supercharger valve acts as a resistance to the throttle valve. An amount of air stream corresponding to the throttle angle θ of the throttle valve cannot be obtained. As a result, smooth operation of the engine may not be performed under normal operating conditions.

However, with the first embodiment of the air supplying apparatus according to the present invention, if the throttle angle θ is in a range of 10° to 45°, that is, while the air pump 54 is not operated, the closed operation of the supercharger control valve 50 is delayed longer from the open operation of the throttle valve 36 as compared with a case in the conventional air supplying apparatus. As is apparent from FIG. 3, in the above range, the control angle α of the supercharger control valve 50 is greater than the throttle angle of the throttle valve 36. Therefore, in this range, the supercharger control valve 50 may not act as a resistance to the air intake channel 26. The air stream can be controlled according to the throttle angle θ of the throttle valve 36. As a result, the throttle angle θ of the throttle valve 36 which causes the air pump 54 to operate is assured of being the maximum possible. Further, smooth operation of the engine under normal operating conditions can be achieved.

When the supercharger control valve 50 is set to completely close the air intake channel 26, the pressurized air from the air pump 54 does not flow toward the upstream side but is supplied to the cylinder 10 of the engine through the throttle valve 36. In this supercharging state, the pressurized air is supplied to the combustion chamber so that power is increased as compared with an apparatus without a supercharger, thereby decreasing fuel consumption.

When the supercharger is operated, that is, when the throttle valve 36 is opened and the supercharger control valve 50 is completely closed, assume that a foreign material is stuck between the control valve shaft 60 and the wall of the duct 40, or that the slidable portion therebetween is frozen, so that the supercharger control valve 50 is locked.

Figure 6:
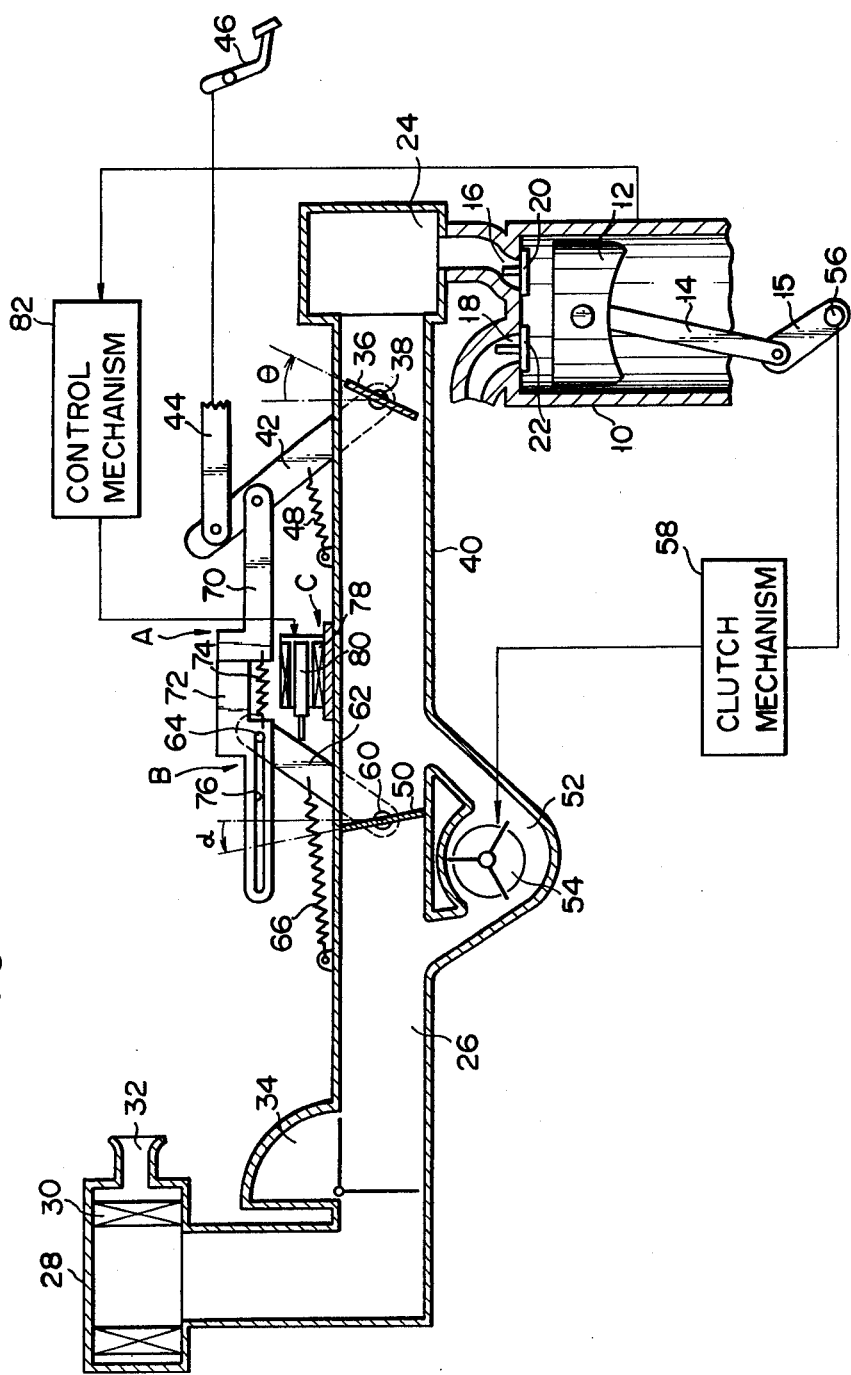
FIG. 6 is a schematic side view of the air supplying apparatus shown in FIG. 1 wherein the throttle valve almost returns to an initial position to an extent that it is inclined at the minimum angle to slightly open the air intake channel, when the control valve is locked to close the air intake channel.

Since the conventional link mechanism is rigid, the throttle valve 36 becomes locked open in accordance with the locked state of the supercharger control valve 50. As the pressurized air from the air pump 54 is continued to be supplied, the engine cannot be controlled and the car is out of control. However, with the first embodiment of the air supplying apparatus according to the present invention, the link mechanism 68 has the second play mechanism B, and the second arm 72 and the control lever 62 are connected to each other since the pin 64 of the control lever 62 is fitted in the elongated hole 76 of the second arm 72. Therefore, even if the supercharger control valve 50 is inoperative, the throttle valve 36 is freely operated, as shown in FIG. 6. When the driver releases the accelerator pedal 46, the throttle lever 42 is rotated in the counterclockwise direction by the urging force of the first spring 48. The elongated hole 76 of the second arm 72 is freely moved relative to the pin 64 of the control lever 62, so that the second arm 72 is displaced relative to the control lever 62 by the predetermined distance d in the direction opposite to that indicated by the arrow X, allowing rotation of the throttle lever 42. As a result, the throttle valve 36 is positioned with the minimum throttle angle of 10°, so the air stream flowing into the cylinder 10 of the engine is reduced, thus greatly reducing excessive air. Therefore, the gas mixture of air and fuel is greatly reduced, decreasing the rotating rate of the engine. Accidental acceleration is thus prevented.

In the conventional air supplying apparatus, since a rigid link mechanism connects the supercharger control valve to the throttle valve, the opening/closing operation of the throttle valve is directly transmitted to the supercharger control valve. Assume that the engine is driven at a low rotating rate with a high load. For example, the driver starts the car and depresses the accelerator pedal, or drives up a slope. In this case, the throttle valve 36 is almost fully opened. However, since the rotating rate of the engine is low, knocking may occur if the supercharger control valve is closed and pressurized air from the air pump is supplied to the cylinder.

Figure 7:
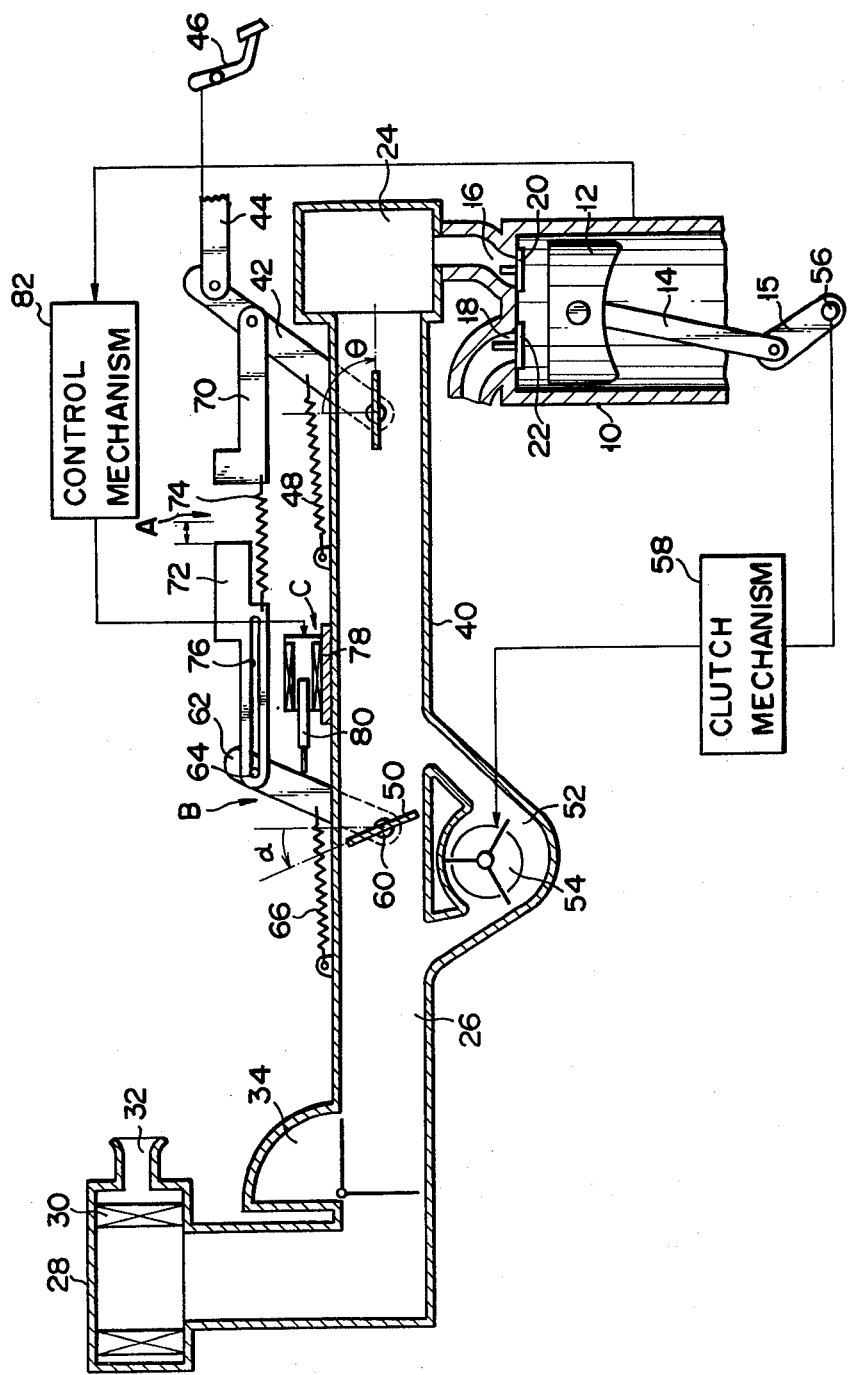
FIG. 7 is a schematic side view of the air supplying apparatus shown in FIG. 1 wherein the control valve is rotated to open the air intake channel, thus releasing the close of the air intake channel, when the throttle valve is inclined at the maximum angle to fully open the air intake channel.

However, the first embodiment of the air supplying apparatus according to the present invention is operated as shown in FIG. 7, if the rotating rate of the engine is less than the predetermined value and even though the throttle valve 36 is opened. Since the rotating rate of the engine is constantly detected by the control mechanism 82, the control mechanism 82 causes the solenoid 78 to be energized if the rotating rate of the engine is less than the predetermined value. The energized solenoid 78 causes its electromagnetic force to displace the plunger 80 from the first position to the second position. The control lever 62 which contacts with the plunger 80 is forcibly rotated in the counterclockwise direction through the first play mechanism A. The control angle $\alpha$ of the supercharger control value 50 is changed from 10°, at which the air intake channel 26 is completely closed, to 20°, at which the channel 26 is slightly open. Therefore, even if the pressurized air from the air pump 54 is supplied from the supercharger channel 52 to the downstream side of the air intake channel 26, the pressurized air flows back through the area surrounding the supercharger control valve 50 to the upstream side. Therefore, the pressurized air supplying to the engine is decreased.

With the first embodiment of the air supplying apparatus according to the present invention, the link mechanism 68 has the first and second arms 70 and 72 which can be spaced apart from each other. Even if the control lever 62 is rotated in the counterclockwise direction, this rotation does not affect the throttle lever 42 at all. When the throttle lever 42 is rotated in the clockwise direction, the first and second arms 70 and 72 are spaced apart from each other against the urging force of the third spring 74 and are maintained in the second state, thus allowing rotation of the throttle lever 42 independently. As a result, the throttle valve 36 can be fully opened while the supercharger control valve 50 is kept at the slightly open state.

When the throttle valve 36 is opened, a great amount of gas mixture is supplied to the engine so that power is increased. However, if the rotating rate of the engine is less than the predetermined value, the supercharger control valve 50 slightly opens the air intake channel 26 as described above. Thus, the pressurized air from the air pump 54 can flow back to the upstream side, flowing through the area surrounding the supercharger control valve 50. The supercharged air cannot be substantially supplied to the engine. Therefore, any incomplete combustion at low engine rotating rate such as the knocking caused by the supercharged air is prevented. Even if the supercharger control valve 50 is opened at a low engine rotating rate so as not to supply supercharged air to the engine, this state corresponds to operation of the engine without the air pump 54. Therefore, power can be increased using the throttle valve 36, and also operational inconvenience can be prevented.

As discussed in detail above, according to a first feature of the first embodiment, the first play mechanism A is provided to delay the closing operation of the supercharger control valve 50 from the opening operation of the throttle valve 36. Consequently, the throttle angle $\theta$ of the throttle valve 36 which will cause the supercharger to operate will be greater. Further, even if the supercharger is not operated, the control angle $\alpha$ of the supercharger control valve 50 is set to be larger than the throttle angle $\theta$ of the throttle valve 36. The air stream corresponding to the throttle angle $\theta$ of the throttle valve 36 can be controlled with high precision, so that smooth operation of the engine is achieved.

According to a second feature of the first embodiment, in the supercharger operating mode such that the throttle valve is opened and the supercharger control valve is closed, even if the supercharger control valve 50 is inoperative, the throttle valve 36 is properly operated independently of the supercharger control valve due to the second play mechanism B disposed in the link mechanism 68. Even in the supercharger operating mode, the amount of gas mixture to be supplied to the engine is decreased to lower the rotating rate of the engine. Therefore, accidental acceleration or the like is completely prevented.

According to a third feature of the first embodiment, the link mechanism 68 which connects the throttle valve 36 to the supercharger control valve 50 has the first play mechanism A by which the supercharger control valve 50 can open the air intake channel 26 independently of the closing operation of the throttle valve 36. Further, the link mechanism 68 has a release mechanism C for maintaining the supercharger control valve 50 to open the air intake channel 26 by movement of the plunger from the first position to the second position according to electromagnetic action when the rotating rate of the engine is detected to be lower than the predetermined value. Therefore, quite independently of the closing/opening operation of the throttle valve 36, the supercharger control valve 50 is inclined so as to open the air intake channel 26 if the rotating rate of the engine is less than the predetermined value. The supercharged air from the air pump 54 is then decreased or stopped, thereby preventing incomplete combustion which causes knocking of the engine. Therefore, even if the engine is driven at low rotating rate with a high load, that is, if the driver starts the car and depresses the accelerator pedal 46, or drives up a slope, smooth driving can be achieved.

The present invention is not limited to the first embodiment described above. Various changes and modifications may be made within the spirit and scope of the present invention. The values described above are only examples and may be varied as needed.

Figure 8:
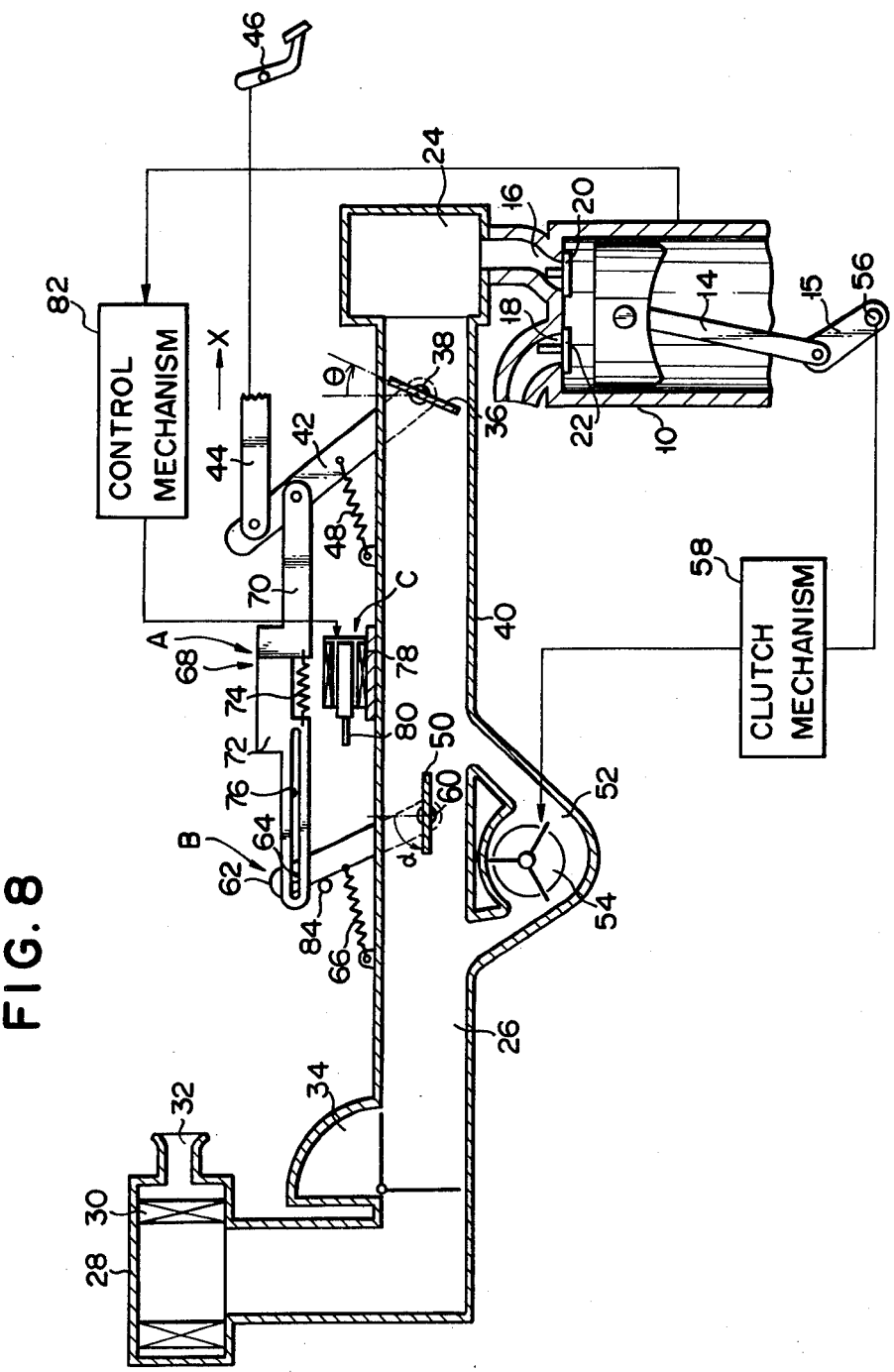
FIG. 8 is a schematic side view of a first modification of the air supplying apparatus shown in FIG. 1.

In the first embodiment described above, the throttle valve 36 is opened synchronously when the supercharger control valve 50 is closed. In particular, the control angle α of the supercharger control valve 50 is first decreased from 110° to 90° so that the supercharger control valve 50 is then fully opened, and thereafter, the closing operation is performed. Thus, the closing operation of the supercharger control valve 50 is delayed from the opening operation of the throttle valve 36. The change in the control angle α of the supercharger control valve 50 corresponds, after a delay, to that in the throttle angle θ of the throttle valve 36. This sequential operation is not defined only by the first embodiment of the present invention. Note that the closing operation of the supercharger control valve 50 need only be delayed from the opening operation of the throttle valve 36. That is, the delay must cause the air pump 54 to operate across a wide range of rotation of the throttle valve 36. Further, until the air pump 54 is sufficiently operated, the control angle α of the supercharger control valve 50 must be greater than the throttle angle θ of the throttle valve 36. For example, in a first modification of the air supplying apparatus in FIG. 8, at a position where the control lever 62 defines the control angle α of the supercharger control valve 50 to be 90°, a stopper 84 is so disposed as to interrupt rotation of the control lever 62 by the urging force of the second spring 66 in the counterclockwise direction. Provided with the stopper 84, even if the throttle valve 36 is opened, the supercharger control valve 50 is not closed until the throttle valve 36 is inclined at a predetermined angle through the second play mechanism B. In this manner, the closing operation of the supercharger control valve 50 may be delayed from the opening operation of the throttle valve 36.

Figure 9:
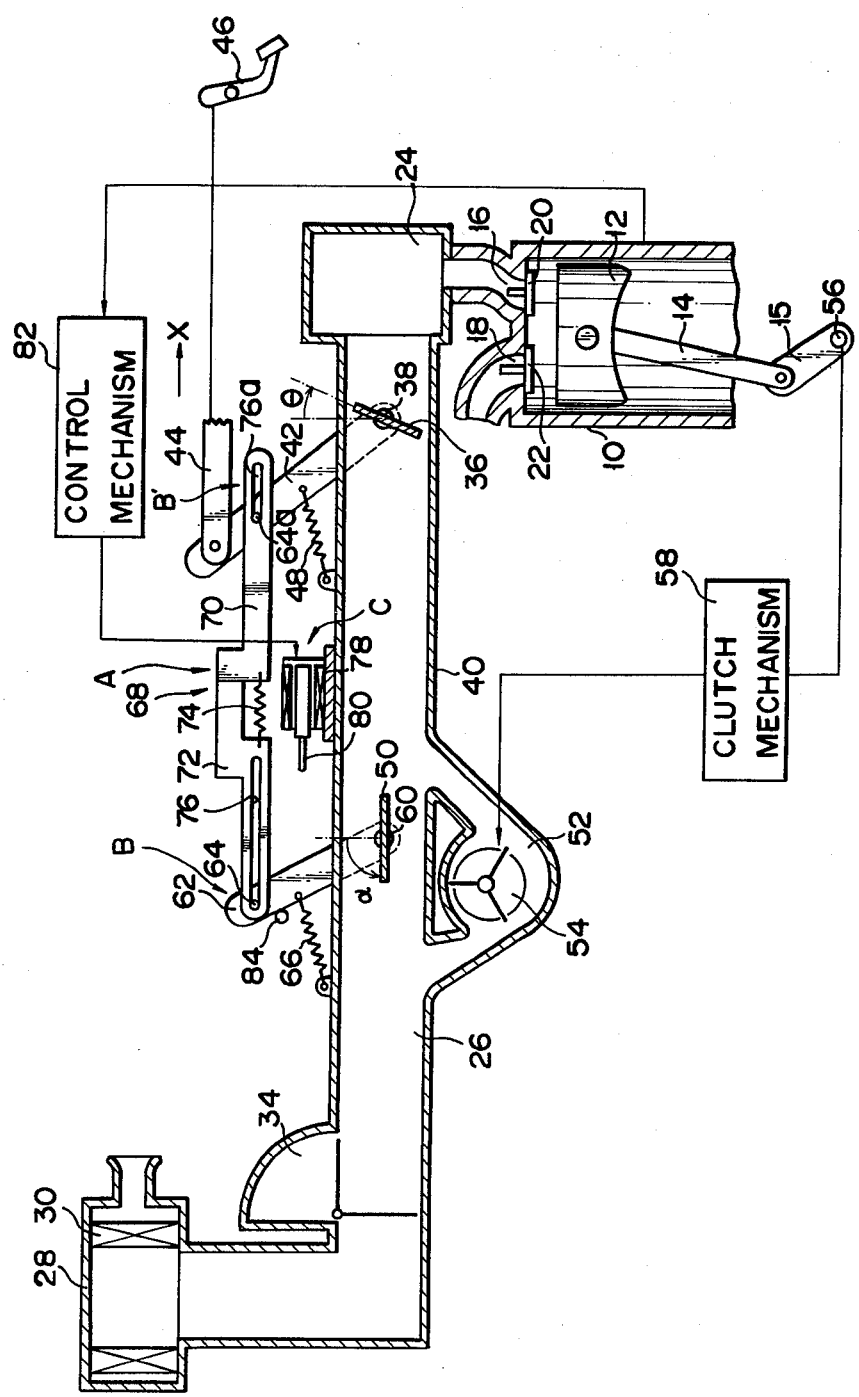
FIG. 9 is a schematic side view of a second modification of the air supplying apparatus shown in FIG. 1.

Also, as shown in FIG. 9 in a second modification of the first embodiment, a delay mechanism B' may be provided independently. The delay mechanism B' includes an elongated hole 76a formed in the first arm 70 and a pin 64a attached to the middle portion of the throttle lever 42 and fitted into the elongated hole 76a. In the state where the control level 62 is abut with the stopper 84, that is the control angle α is set at 90°, the pin 64 is positioned in the most left side portion of the elongated hole 64, and the pin 64a is urged to the most left side portion of the elongated hole 76a by the urging force of the first spring 48, whereby the throttle angle θ is set at 10°. With above-mentioned construction, even if the throttle valve 36 is rotated from the throttle angle θ of 10° by a predetermined angle, the pin 64a only slides in the elongated hole 96a and the first arm 70 never rotate, whereby the control valve 50 is held its position with control angle α of 90°. Thus, the effect similar to the first modification is obtained in the second modification.

In the first embodiment, the air pump 54 acting as the supercharger is driven by the crankshaft 56 of the engine. However, the supercharger may be a so-called turbo-charger which is driven by the exhaust gases as the driving source.

In the first embodiment, the elongated hole 76 of the second play mechanism B is formed in the second arm 72 to allow movement between the control lever 62 and the second arm 72. However, the present invention is not limited to the above arrangement. For example, an elongated hole may be formed in the first arm 70 to allow movement between the throttle lever 42 and the first arm 70. Alternatively, an elongated hole may be formed in the control lever 62 or the throttle lever 42 to obtain the same effects as in the first embodiment.

Figure 10:
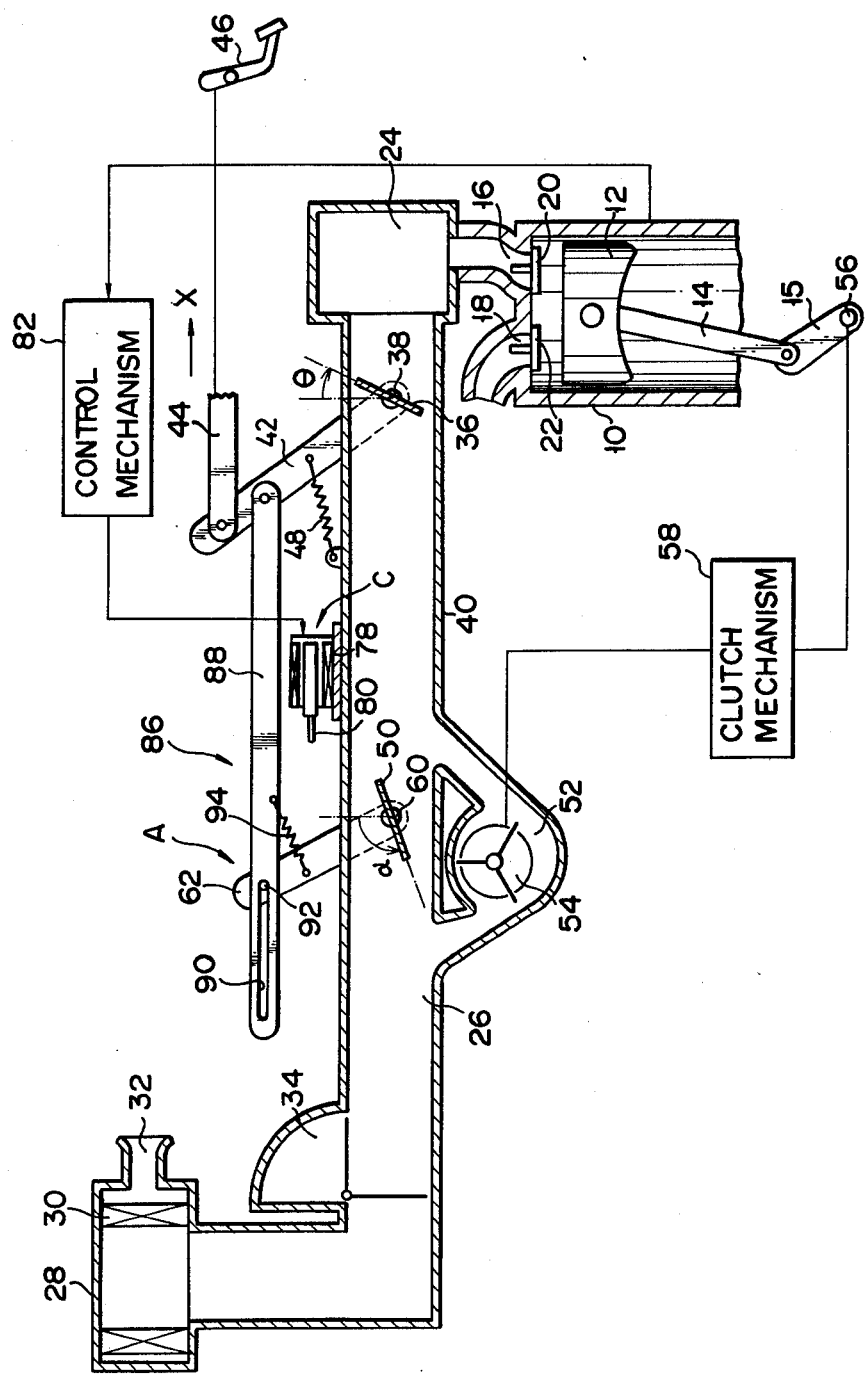
FIG. 10 is a schematic side view of a third modification of the air supplying apparatus shown in FIG. 1.

In the first embodiment, the first and second arms 70 and 72 acting as the first play mechanism A are disposed in the link mechanism 68 and can be separated from each other. However, an arrangement of a third modification as shown in FIG. 10 may be employed. Referring to FIG. 10, a link mechanism 86 which connects the throttle lever 42 to the control lever 62 has a single third arm 88. One end of the third arm 88 is pivotally mounted on the throttle lever 42. An elongated hole 90 is longitudinally formed at the other end of the third arm 88. The control lever 62 has a pin 92 which is fitted in the elongated hole 90, at the upper end thereof. Since the pin 92 is fitted in the elongated hole 90, the third arm 88 is slidably attached to the control lever 62. A fourth spring 94 is stretched between the control lever 62 and the third arm 88. The fourth spring 94 urges the control lever 62 to rotate in the clockwise direction. The position of the control lever 62 is defined by the abutment of the pin 92 of the control lever 62 with the right side edge of the elongated hole 90 by the urging force of the fourth spring 94. In the third modification, the first play mechanism A is constituted by the elongated hole 90, the pin 92 and the fourth spring 94.

With the above arrangement of the first play mechanism A, the control lever 62 is rotated in the counterclockwise direction by slidable movement between the pin 92 and the elongated hole 90, against the urging force of the four spring 94, in accordance with displacement of the plunger 80 from the first position to the second position consequent upon energization of the solenoid 78. Therefore, the control valve 50 is rotated independently of the rotating position of the throttle valve 36 to open the air intake channel 26.

Figure 11:
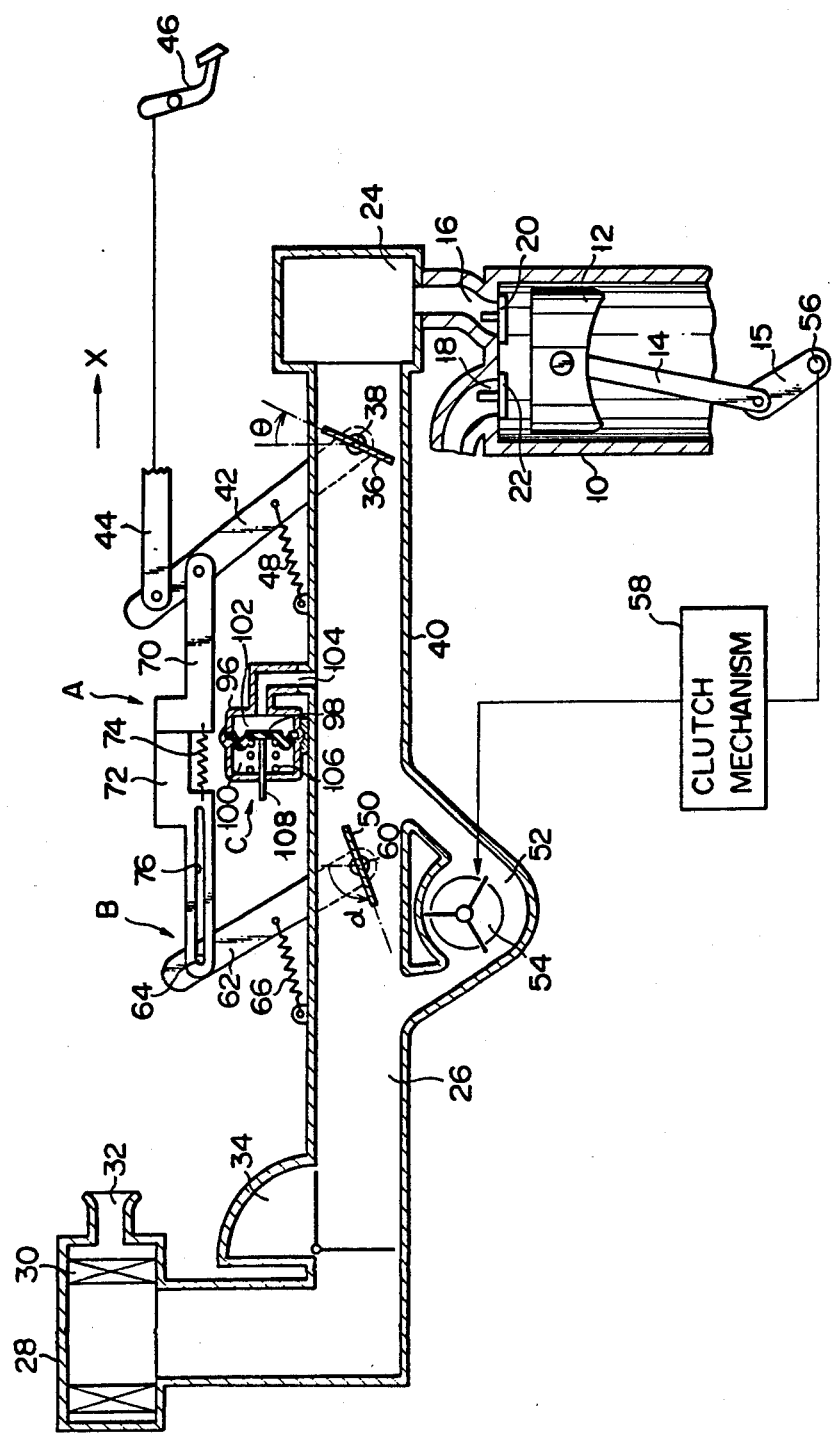
FIG. 11 is a schematic side view of a second embodiment of the air supplying apparatus according to the present invention wherein the throttle valve is inclined at the minimum angle to slightly open the air intake channel.

In the first embodiment described previously, the release mechanism C detects the rotating rate of the engine. If the rotating rate is less than the predetermined value, the supercharger control valve 50 is released to open the air intake channel 26. However, the release mechanism C may not be released solely under the above condition, but under a different operating condition. For example, the release mechanism C may be arranged in a manner shown in a second embodiment of FIGS. 11 to 13. Referring to FIG. 11, the release mechanism C has an actuator casing 96 which is mounted in the same position as the solenoid 78. The inside space of the actuator casing 96 is air-tightly divided into an atmospheric air chamber 100 and a pressurized chamber 102 by a movable wall such as a diaphragm 98. The pressurized chamber 102 communicates with that portion of the air intake channel 26 which lies between the supercharger control valve 50 and the throttle valve 36 through a communicating channel 104. A fifth spring 106 is housed in the atmospheric air chamber 100. When pressure does not act from the air intake channel 26 on the pressurized chamber 102, the fifth spring 106 urges the diaphragm 98 to a predetermined position. A plunger 108, the outer end of which extends from the actuator casing 96 towards control level 62, is connected at its inner end to the diaphragm 98. When the pressure in the pressurized chamber 102 is increased and the diaphragm 98 expands, the plunger 108 is moved against the urging force of the fifth spring 106 in the direction opposite to that indicated by arrow X. The diaphragm 98 expands when the pressure of the pressurized chamber 102 is greater than a predetermined supercharge pressure.

Figure 12:
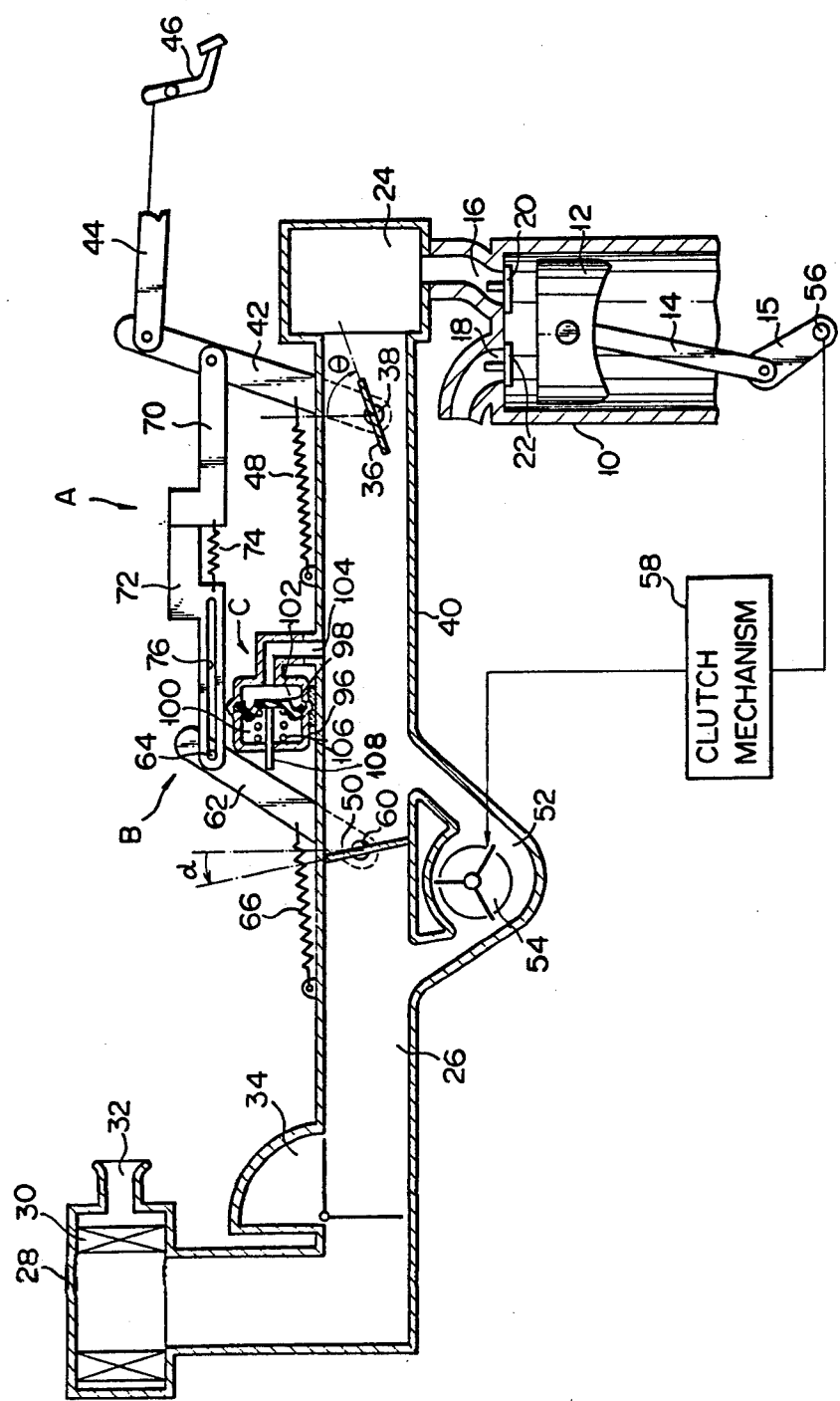
FIG. 12 is a schematic side view of the air supplying apparatus shown in FIG. 11 wherein the throttle valve is inclined ($\theta = 70°$) to almost fully open the air intake channel.
Figure 13:
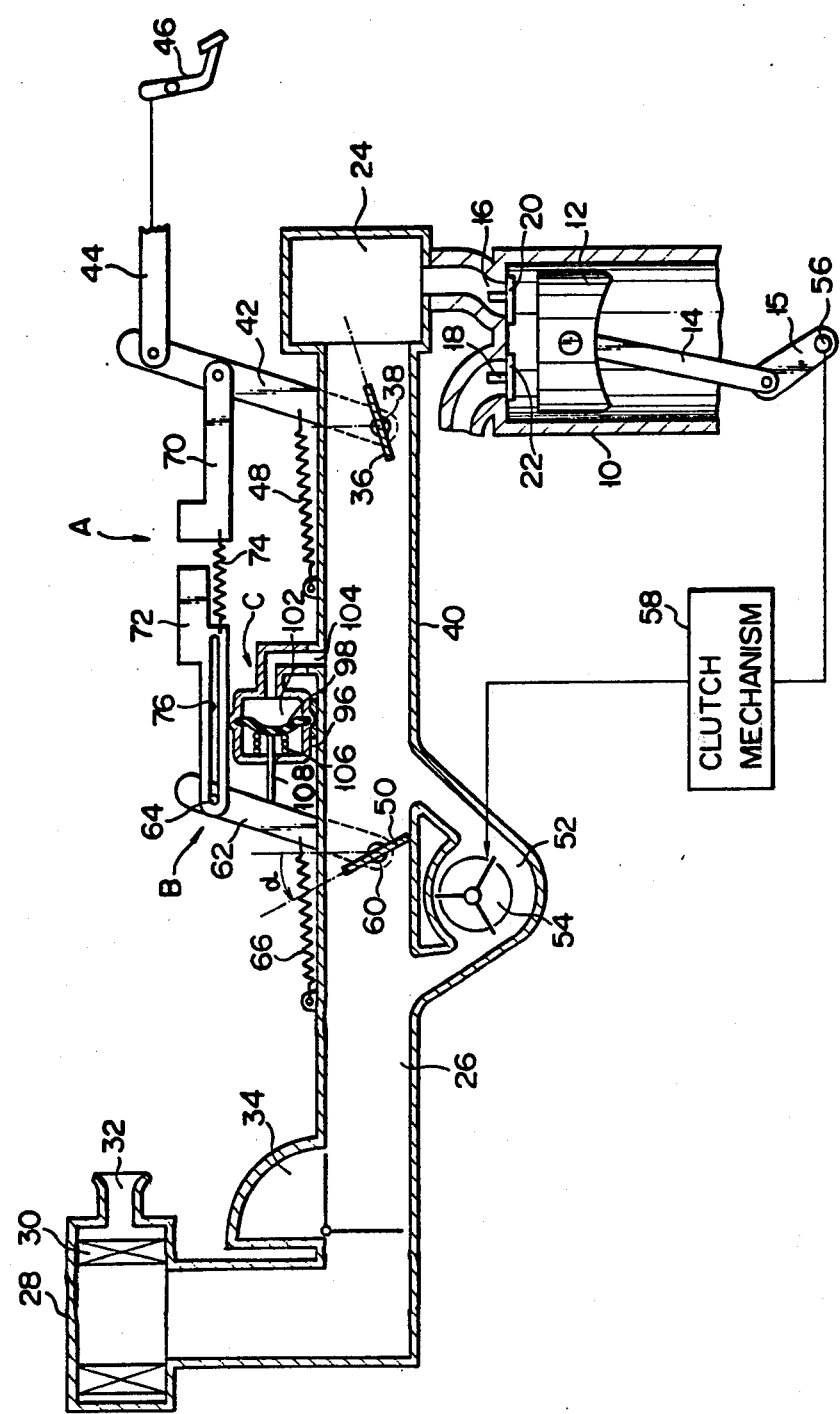
FIG. 13 is a schematic side view of the air supplying apparatus shown in FIG. 12 wherein the control valve is rotated to open the air intake channel, thus releasing the close of the air intake channel.

The release mechanism C is arranged as described above so that the supercharger control valve 50 is rotated in the counterclockwise direction as shown in FIG. 13 without adversely affecting the throttle angle θ of the throttle valve 36, when the supercharge pressure is greater than the predetermined value in the condition where the supercharger control valve 50 is inclined to close the air intake channel 26 and the air pump 54 is driven as shown in FIG. 12, whereby the supercharged air is not substantially supplied to the cylinder 10. Thus, the release mechanism C eliminates the various conventional drawbacks such as knocking and lowering of power which are caused when the supercharging pressure is higher than the predetermined value.

With the second embodiment, since a relief channel for further by-passing the supercharger channel need not be formed to keep the pressure of the supercharged air below the predetermined value, the air supplying apparatus can be small in size as a whole. Further, since the pressure of the supercharged air is detected by the diaphragm, air leakage which conventionally occurs in a relief valve can be properly prevented, resulting in highly precise control of the supercharge pressure.

Figure 14:
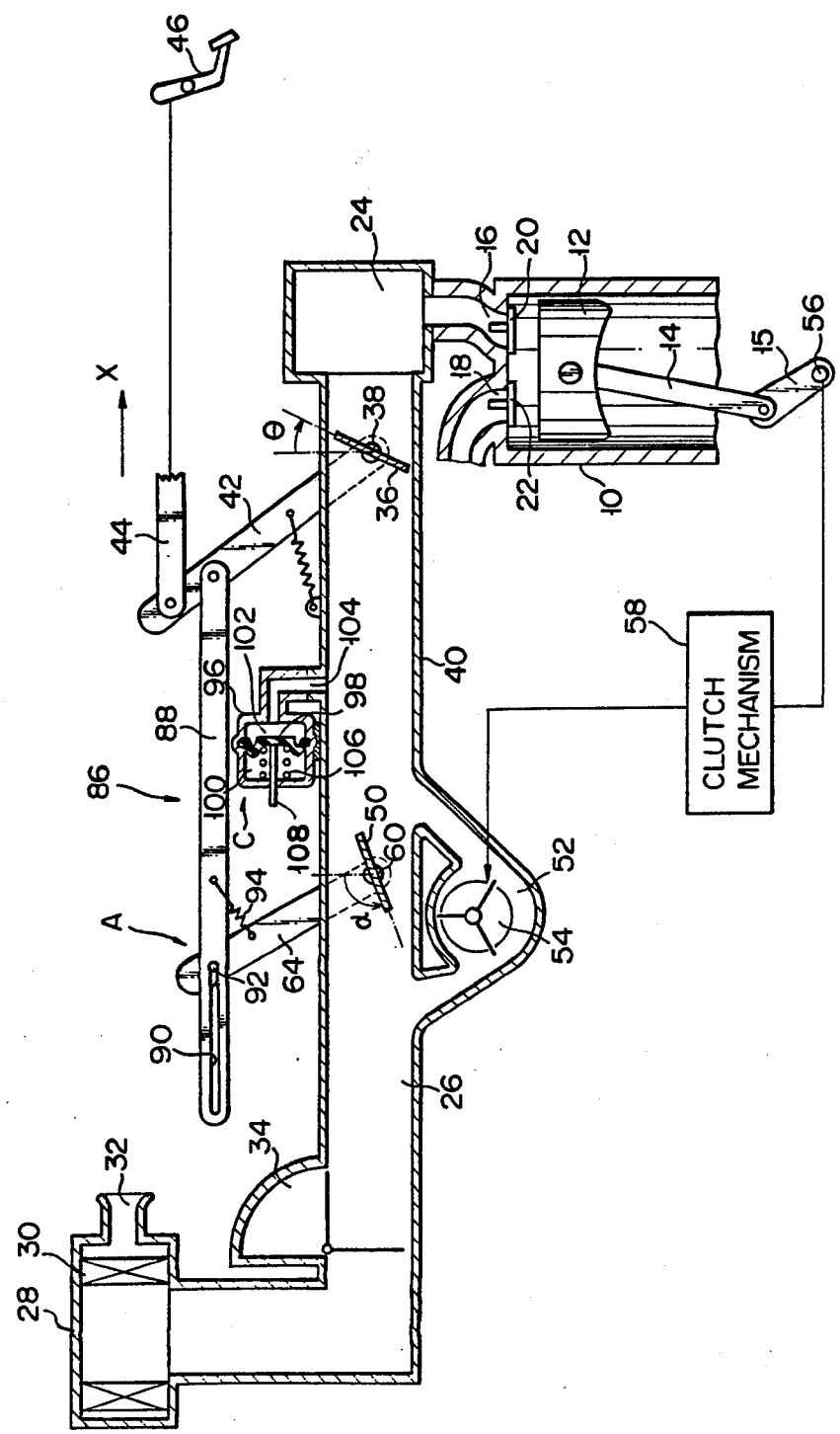
FIG. 14 is a schematic side view of a fourth modification of the air supplying apparatus shown in FIG. 11.

Further, in the second embodiment, the first play mechanism A may be assembled as a fourth modification shown in FIG. 14. The air supply apparatus according to the fourth modification is arranged in the same manner as that according to the third modification (FIG. 10) of the first embodiment, and a detailed description thereof will be omitted.

Figure 15:
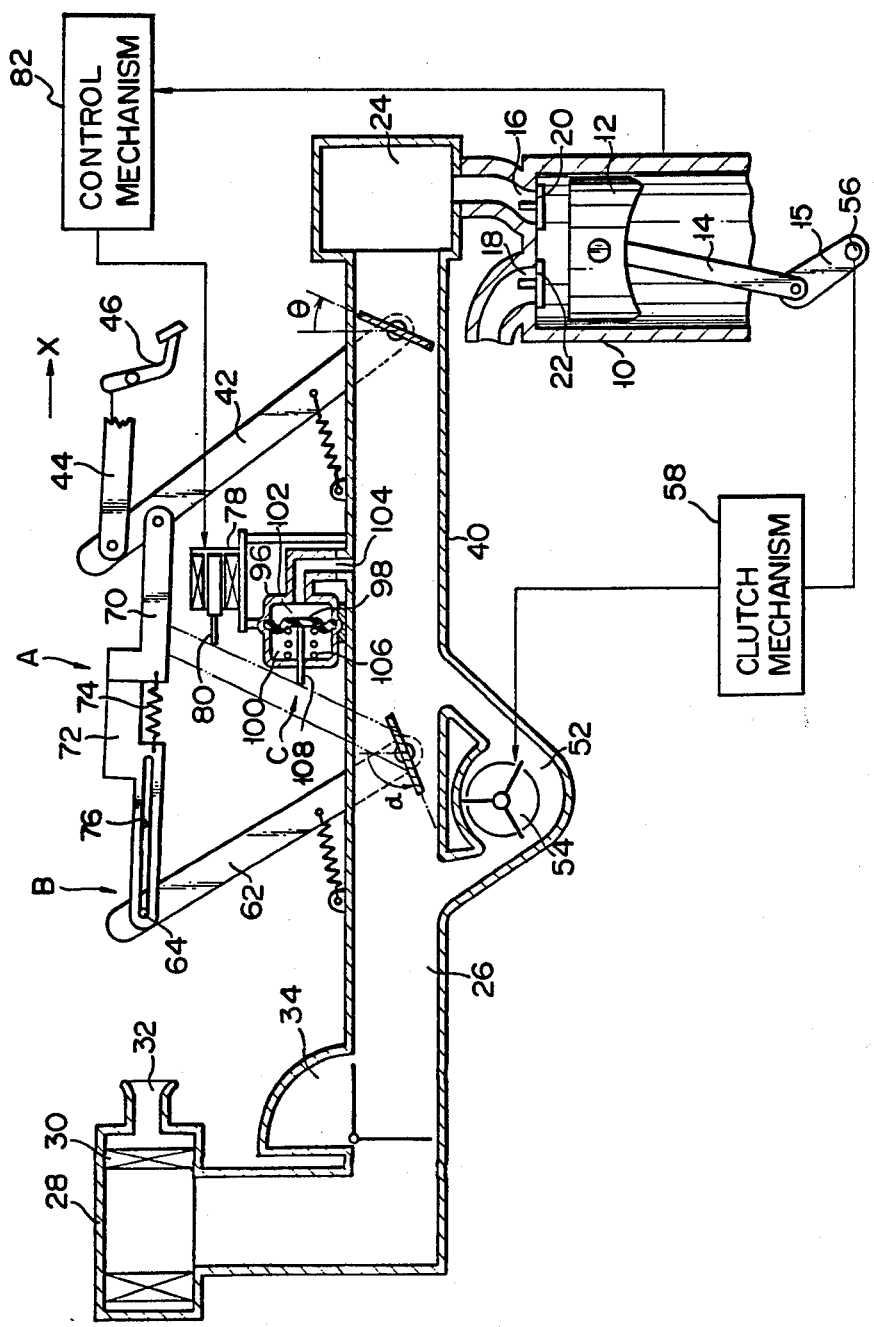
FIG. 15 is a schematic side view of a fifth modification of the air supplying apparatus shown in FIG. 11.

Further, the release mechanism C may further comprise the solenoid 72, the plunger 80 and the control mechanism 82 as shown in a fifth modification of FIG. 15.

Figure 16:
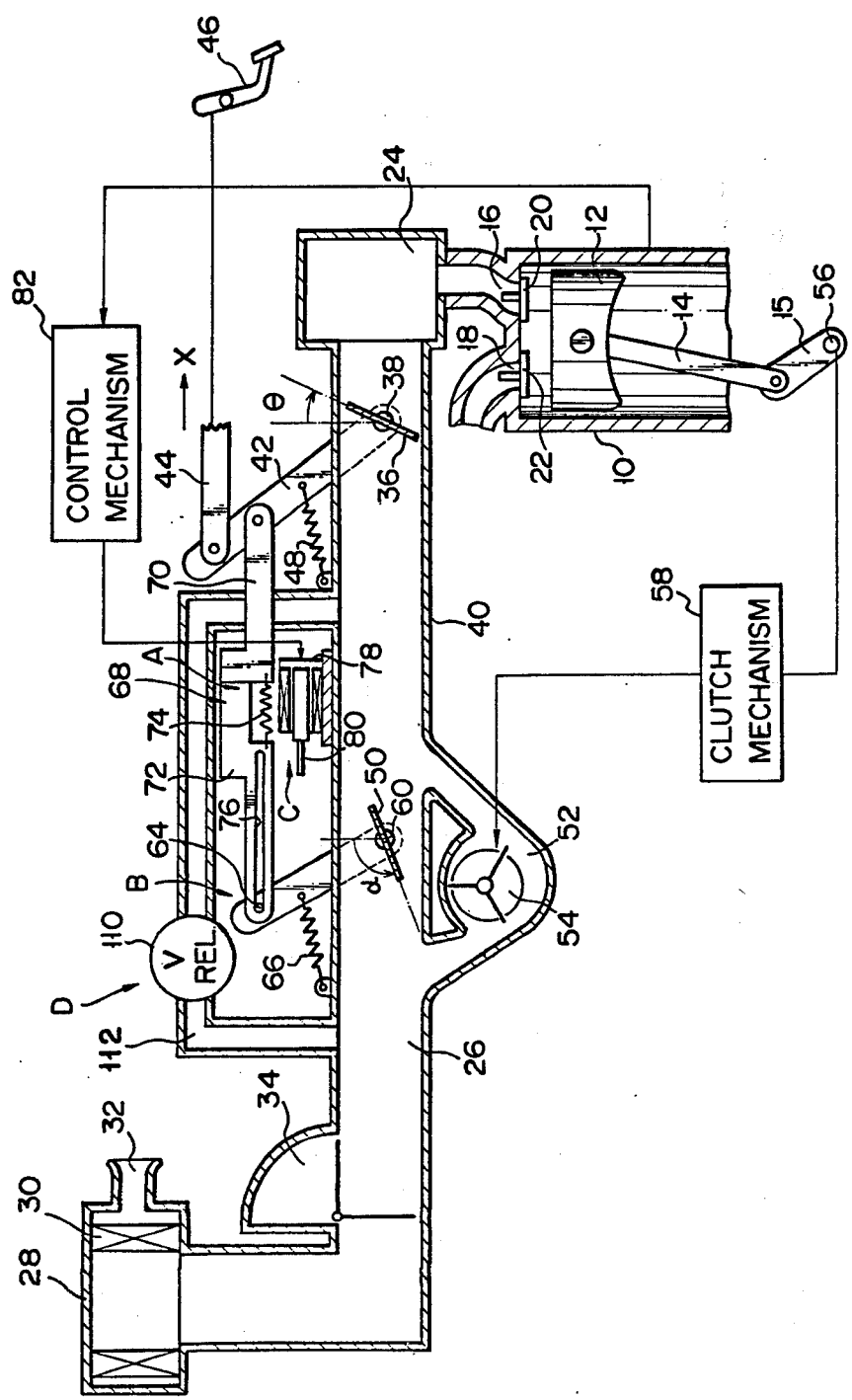
FIG. 16 is a schematic side view of a third embodiment of the air supplying apparatus according to the present invention.

Further, referring to a third embodiment shown in FIG. 16, a supercharging pressure control mechanism D may be added to the arrangement of the first embodiment. The supercharging pressure control mechanism D has a communicating channel 112 which is connected to the air intake channel 26 by a by-pass around the supercharger control valve 50 and a relief valve 110 disposed in the communicating channel 112. The relief valve 110 opens when the supercharging pressure is greater than the predetermined value and causes the communicating channel 108 to communicate with the air intake channel 26. Therefore, if the relief valve is opened, the air intake channel 26 is by-passed so that the supercharging effect by the air pump 54 is weakened and the supercharging pressure is lowered.

As described above, since the supercharging pressure control mechanism D is added to the arrangement of the first embodiment, air is properly supplied to the cylinder 10.

The same reference numerals used in the first embodiment denote the same parts in the second and third embodiments, and a detailed description thereof has been omitted.

In summary, the present invention provides the air supplying apparatus wherein the supercharger can be operated within the desired operating range and wherein, even if trouble occurs in either one of the supercharger and throttle control valves, trouble may not be transmitted to the the other valve.

What we claim is:
1. An apparatus for supplying air to a cylinder of an engine, comprising:
   a first channel, one end of which is open to the atmosphere, the other end of which is connected to the cylinder and in which an air stream flowing toward the cylinder is provided;
   a first valve in the first channel adjacent said other end thereof and being movable between a first position where the first valve sets the cross-sectional area of the air stream minimum and a second position where the first valve sets the same maximum, thereby controlling the output power of the engine;
   a second valve in the first channel adjacent said one end thereof and being movable between a third position where the second valve closes the first channel and a fourth position where the second valve opens the first channel;
   a second channel attached to the first channel to bypass the second valve;
   a supercharger provided in the second channel;
   a link mechanism connecting the first valve to the second valve, to move the second valve from the fourth position to the third position when the first valve moves from the first position to the second position, and to move the second valve from the third position to the fourth position when the first valve moves from the second position to the first position; and
   play means attached to the link mechanism, for allowing one of the first and second valves to move when the other valve is held at a fixed position,
   wherein the second valve is rotatably mounted and, when the second valve is in the fourth position, an angular interval between the fourth position and the third position is set greater by a predetermined angle than an angular interval between the third position and a position where the first channel is opened to a maximum, whereby initial movement of the second valve to close the first channel is delayed from the initial movement of the first valve from the first position,
   wherein the play means has a first play mechanism for allowing movement of the second valve from the third position to the fourth position, while the position of the first valve is retained, and
   wherein the link mechanism includes:
   a movable first lever fixed to the first valve, for defining a position of the first valve; and
   a movable second lever connected to the second valve, for defining a position of the second valve in response to the movement thereof, and
   the first play mechanism includes:
   a first arm connected to the first lever;
   a second arm connected to the second lever to be contactible with the first arm; and
   urging means for urging the first and second arms to contact each other;
   whereby the first valve is rotated from the first position to the second position since the first arm is separated from the second arm, even if the second valve is fixed in position, and the second valve is rotated from the third position to the fourth position since the second arm is separated from the first arm, even if the first valve is fixed in position.

2. The apparatus according to claim 1, wherein the second valve opens the first channel to a maximum at the fourth position; and which further comprises
   delay means attached to the link mechanism, for delaying initial movement of the second valve from the fourth position from initial movement of the first valve from the first position.

3. The apparatus according to claim 2, wherein the second valve is mounted on the link mechanism so that the second valve reaches the third position before the first valve reaches from the first position to the second position.

4. The apparatus according to claim 3, wherein the delay means includes a retaining mechanism for retaining the second valve at the fourth position until the first valve is displaced from the first position toward the second position for a predetermined distance.

5. The apparatus according to claim 4, wherein the link mechanism includes:
   a movable first lever fixed to the first valve, for defining a position of the first valve;
   a movable second lever connected to the second valve, for defining a position of the second valve in response to the movement thereof; and
   a third lever for connecting the first lever to the second lever, and
   the retaining mechanism includes:
   an elongated hole formed in the third lever;
   a pin provided to the second lever to be fitted in the elongated hole;
   first urging means for urging the second lever to move the second valve from the third position to the fourth position; and
   a stopper pin capable of contacting with the second lever, for stopping the second lever at the fourth position against the first urging means, the pin being retained at a position spaced apart from one end of the elongated hole by a predetermined distance when the second lever is in the fourth position.

6. The apparatus according to claim 1, which further comprises
   releasing means for coming in contact with the second lever which regulates a position of the second valve to the third position, for causing the second lever to rotate the second valve from the third position to the fourth position.

7. The apparatus according to claim 1, 2, 3, 4 or 5, which further comprises:
   a communicating channel connected to the first channel by by-passing around the second valve; and
   a third valve disposed in the communicating channel, for closing the communicating channel when the pressure in the first channel is below the predetermined pressure and for opening the communicating channel when the pressure therein is above the predetermined pressure.

8. An apparatus for supplying air to a cylinder of an engine, comprising:
   a first channel, one end of which is open to the atmosphere, the other end of which is connected to the cylinder and in which an air stream flowing toward the cylinder is provided;
   a first valve in the first channel adjacent said other end thereof and being movable between a first position where the first valve sets the cross-sectional area of the air stream minimum and a second position where the first valve sets the same maximum, thereby controlling the output power of the engine;
   a second valve in the first channel adjacent said one end thereof and being movable between a third position where the second valve closes the first channel and a fourth position where the second valve opens the first channel;
   a second channel attached to the first channel to by-pass the second valve;
   a supercharger provided in the second channel;
   a link mechanism connecting the first valve to the second valve, to move the second valve from the fourth position to the third position when the first valve moves from the first position to the second position, and to move the second valve from the third position to the fourth position when the first valve moves from the second position to the first position; and
   play means attached to the link mechanism, for allowing one of the first and second valves to move when the other valve is held at a fixed position,
   wherein the second valve is rotatably mounted and, when the second valve is in the fourth position, an angular interval between the fourth position and the third position is set greater by a predetermined angle than an angular interval between the third position and a position where the first channel is opened to a maximum, whereby initial movement of the second valve to close the first channel is delayed from the initial movement of the first valve from the first position,
   wherein the play means has a first play mechanism for allowing movement of the second valve form the third position to the fourth position, while the position of the first valve is retained,
   wherein the link mechanism includes:
   a movable first lever fixed to the first valve, for defining a position of the first valve;
   a movable second lever connected to the second lever, for defining a position of the second valve in response to the movement thereof; and
   a third lever for connecting the first lever to second lever, and
   the first play mechanism includes:
   an elongated hole formed in the third lever;
   a pin formed in the second lever to be fitted in the elongated hole;
   urging means for urging the second lever to rotate the second valve from the third position to the fourth position, the pin being urged by the urging means against one end of the elongated hole when the first valve is in the first position,
   whereby the second valve is rotated from the third position to the fourth position since the pin is moved from one end to the other end of the elongated hole against the urging means, even if the first valve is fixed in position; and
   releasing means capable of coming in contact with the second lever which regulates a position of the second valve to the third position, for causing the second lever to rotate the second valve from the third position to the fourth position.

9. The apparatus according to claim 6 or 8, including means comprising a first releasing mechanism included in said releasing means for causing the second lever to rotate when a rotating rate of the engine is smaller than a predetermined value.

10. The apparatus according to claim 9, wherein the first releasing mechanism includes:
- controlling means for detecting the rotating rate of the engine and for initiating a predetermined operation when the rotating rate of the engine is smaller than the predetermined value;
- a solenoid connected to the controlling means and energized in accordance with the predetermined operation; and
- a plunger which is disposed in the solenoid, which is contactible with the second lever, which is located in a fifth position to allow the second valve to remain in the third position when the solenoid is de-energized, which is located in a sixth position to abut against the second lever and to allow the second valve to rotate from the third position to the fourth position when the solenoid is energized.

11. The apparatus according to claim 6 or 8, wherein the releasing means includes a second releasing mechanism which causes the second lever to rotate when a pressure in the first channel is above a predetermined pressure.

12. The apparatus according to claim 11, wherein the second releasing mechanism includes:
- a diaphragm which is kept in a seventh position when the pressure in the air intake channel is below the predetermined pressure and which is moved to an eighth position when the pressure therein is above the predetermined pressure; and
- an actuator which is connected to the diaphragm, which is contactible with the second lever, which is kept in a ninth position to allow the second valve to remain in the third position when the diaphragm is in the seventh position, and which is kept at a tenth position to abut against the second lever and to allow the second valve to rotate from the third position toward the fourth position when the diaphragm is moved from the seventh position to the eighth position.

13. An apparatus for supplying air to a cylinder of an engine, comprising:
- a first channel, one end of which is open to the atmosphere, the other end of which is connected to the cylinder and in which an air stream flowing toward the cylinder is provided;
- a first valve in the first channel adjacent said other end thereof and being movable between a first position where the first valve sets the cross-sectional area of the air stream minimum and a second position where the first valve sets the same maximum, thereby controlling the output power of the engine;
- a second valve in the first channel adjacent said one end thereof and being movable between a third position where the second valve closes the first channel and a fourth position where the second valve opens the first channel;
- a second channel attached to the first channel to bypass the second valve;
- a supercharger provided in the second channel;
- a link mechanism connecting the first valve to the second valve, to move the second valve from the fourth position to the third position when the first valve moves from the first position to the second position, and to move the second valve from the third position to the fourth position when the first valve moves from the second position to the first position; and
- play means attached to the link mechanism, for allowing one of the first and second valves to move when the other valve is held at a fixed position, wherein the second valve is rotatably mounted and, when the second valve is in the fourth position, an angular interval between the fourth position and the third position is set greater by a predetermined angle than an angular interval between the third position and a position where the first channel is opened to a maximum, whereby initial movement of the second valve to close the first channel is delayed from the initial movement of the first valve from the first position, wherein the play means has a second play mechanism for allowing the first valve to move from the second position toward the first position when the second valve is retained in the third position, and wherein the link mechanism includes:
- a movable first lever fixed to the first valve, for defining a position of the first valve;
- a movable second lever connected to the second valve, for defining a position of the second valve in response to the movement thereof; and
- a third lever for connecting the first lever to the second lever, and the second play mechanism includes:
- an elongated hole formed in the third lever;
- a pin formed in the second lever to be fitted in the elongated hole; and
- urging means for urging the second lever to rotate the second valve from the third position to the fourth position, the pin being urged by the urging means against one end of the elongated hole when the second valve is in the third position, whereby the first valve is rotated from the second position to the first position since the pin is moved from one end to the other end of the elongated hole against the urging means, even if the second valve is fixed in position.

* * * * *